(12) United States Patent
Reisner et al.

(10) Patent No.: US 10,893,266 B2
(45) Date of Patent: Jan. 12, 2021

(54) METHOD AND SYSTEM FOR OPTIMIZING BITRATE SELECTION

(71) Applicant: Disney Enterprises, Inc., Burbank, CA (US)

(72) Inventors: Samuel Joseph Reisner, Burbank, CA (US); Michael Kidd, Burbank, CA (US)

(73) Assignee: Disney Enterprises, Inc., Burbank, CA (US)

(*) Notice: Subject to any disclaimer, the term of this patent is extended or adjusted under 35 U.S.C. 154(b) by 858 days.

(21) Appl. No.: 14/508,214

(22) Filed: Oct. 7, 2014

(65) Prior Publication Data

US 2016/0100162 A1  Apr. 7, 2016

(51) Int. Cl.
| | | |
|---|---|---|
| H04N 19/164 | (2014.01) | |
| H04N 19/115 | (2014.01) | |
| H04N 19/156 | (2014.01) | |
| H04N 19/162 | (2014.01) | |
| H04N 19/184 | (2014.01) | |

(52) U.S. Cl.
CPC ......... *H04N 19/115* (2014.11); *H04N 19/156* (2014.11); *H04N 19/162* (2014.11); *H04N 19/184* (2014.11)

(58) Field of Classification Search
CPC .. H04N 19/115; H04N 19/162; H04N 19/184; H04N 19/156
See application file for complete search history.

(56) References Cited

U.S. PATENT DOCUMENTS

| | | | | |
|---|---|---|---|---|
| 6,385,587 | B1 * | 5/2002 | Heo | G10L 19/0017 341/107 |
| 6,477,501 | B1 * | 11/2002 | Heo | G10L 19/0017 341/107 |
| 7,355,530 | B2 * | 4/2008 | Labelle | H04N 21/2402 341/51 |
| 7,428,244 | B2 * | 9/2008 | Nilsson | H04L 12/1886 370/235 |
| 7,562,145 | B2 * | 7/2009 | Aiken, Jr. | G06F 9/5033 709/220 |
| 7,818,444 | B2 | 10/2010 | Brueck et al. | |
| 8,099,473 | B2 * | 1/2012 | Biderman | H04N 7/17318 380/212 |
| 8,259,735 | B2 * | 9/2012 | Gutman | H04N 21/2356 370/395.21 |
| 8,325,800 | B2 * | 12/2012 | Holcomb | H04N 19/147 375/240.03 |
| 8,370,514 | B2 | 2/2013 | Hurst et al. | |
| 8,402,156 | B2 | 3/2013 | Brueck et al. | |

(Continued)

OTHER PUBLICATIONS http://scenic.princeton.edu/datami/publications.html; 2 pages.

*Primary Examiner* — Philip P. Dang
(74) *Attorney, Agent, or Firm* — Fay Kaplun & Marcin, LLP (57) ABSTRACT

A method including encoding a video program into a plurality of video streams, each of the plurality of video streams being encoded at a corresponding one of a plurality of bitrates; providing, to a plurality of viewing clients, an option to select one of the plurality of video streams; determining a streaming capacity of each of the viewing clients; and determining an improved plurality of bitrates based on streaming capacities of the plurality of viewing clients.

21 Claims, 5 Drawing Sheets

(56) References Cited

U.S. PATENT DOCUMENTS

| | | | |
|---|---|---|---|
| 8,418,207 B2 | 4/2013 | Jenkin et al. | |
| 8,654,849 B2 * | 2/2014 | Bai | H04N 21/234309 370/389 |
| 8,818,171 B2 * | 8/2014 | Soroushian | H04N 9/80 386/248 |
| 8,830,853 B2 * | 9/2014 | Wurm | H04L 65/80 370/252 |
| 8,861,929 B2 * | 10/2014 | Wainner | H04N 5/765 386/241 |
| 2005/0047503 A1 * | 3/2005 | Han | H04N 19/619 375/240.01 |
| 2006/0085553 A1 * | 4/2006 | Rachwalski | G06F 17/30017 709/233 |
| 2006/0168104 A1 * | 7/2006 | Shimizu | G06F 17/30017 709/218 |
| 2008/0037880 A1 * | 2/2008 | Lai | H04N 19/172 382/232 |
| 2011/0082914 A1 | 4/2011 | Robert et al. | |
| 2011/0122939 A1 * | 5/2011 | Ganesan | H04N 19/115 375/240.01 |
| 2011/0252082 A1 * | 10/2011 | Cobb | H04L 65/605 709/203 |
| 2012/0257671 A1 * | 10/2012 | Brockmann | H04N 21/64753 375/240.02 |
| 2012/0314761 A1 * | 12/2012 | Melnyk | H04L 65/605 375/240.02 |
| 2013/0080701 A1 * | 3/2013 | Markovitz | H04B 7/18517 711/115 |
| 2013/0142499 A1 | 6/2013 | Major et al. | |
| 2013/0145392 A1 | 6/2013 | Major et al. | |
| 2013/0145408 A1 | 6/2013 | Major et al. | |
| 2013/0145410 A1 | 6/2013 | Major et al. | |
| 2013/0145411 A1 | 6/2013 | Major et al. | |
| 2013/0145415 A1 | 6/2013 | Major et al. | |
| 2013/0151626 A1 | 6/2013 | Hurst et al. | |
| 2013/0208809 A1 * | 8/2013 | Lu | H04N 19/30 375/240.26 |
| 2014/0294099 A1 * | 10/2014 | Brydon | H04N 19/196 375/240.26 |

\* cited by examiner

Figure 4

METHOD AND SYSTEM FOR OPTIMIZING BITRATE SELECTION

BACKGROUND

Providers of streaming video may offer streams of the same program encoded at different bitrates, for selection either by a user or automatically by software, in order to provide a high-quality viewing experience to viewers having a variety of streaming capacities. Typically, the bitrates used for the encoding are determined and adjusted only rarely, and are based on industry-standard streaming capacities. As a result, the bitrates commonly used for encoding do not necessarily reflect increases in streaming capacity due to developing technology, or the specific capacities of the viewers of a given provider's programming or a given program.

DETAILED DESCRIPTION

Described herein are methods for optimizing the selection of bitrates used to encode streaming content. A method comprises encoding a video program into a plurality of video streams. Each of the plurality of video streams is encoded at a corresponding one of a plurality of bitrates. The method also comprises providing, to a plurality of viewing clients, an option to select one of the plurality of video streams. The method also comprises determining a streaming capacity of each of the viewing clients. The method also comprises determining an optimized plurality of bitrates based on streaming capacities of the plurality of viewing clients.

Also described herein are systems for optimizing the selection of bitrates used to encode streaming content. A system comprises a video encoder encoding a source video into a plurality of video streams. Each of the plurality of video streams is encoded at a corresponding one of a plurality of bitrates. The system also comprises an optimization logic determining a streaming capacity of each of a plurality of viewing clients of the plurality of video streams and determining an optimized plurality of bitrates based on the streaming capacities of the plurality of viewing clients. The video encoder and the optimization logic are configured to be processed by one or more processors. The one or more processors are coupled to a memory.

Also described herein is a non-transitory computer-readable storage medium storing a set of instructions that are executable by a processor. The set of instructions, when executed by the processor, causes the processor to perform operations comprising encoding a video program into a plurality of video streams. Each of the plurality of video streams is encoded at a corresponding one of a plurality of bitrates. The operations further comprise providing, to a plurality of viewing clients, an option to select one of the plurality of video streams. The operations further comprise determining a streaming capacity of each of the viewing clients. The operations further comprise determining an optimized plurality of bitrates based on streaming capacities of the plurality of viewing clients.

The exemplary embodiments may be further understood with reference to the following description and the related appended drawings, wherein like elements are provided with the same reference numerals. Specifically, the exemplary embodiments relate to methods and systems for optimizing the selection of bitrates used in encoding streaming content.

It is increasingly common for consumers to view streaming video content over the Internet. Viewers of such content may have differing downstream bandwidth capacity (referred to herein as "streaming capacity" for brevity). This capacity may vary due to factors such as the type of connection (e.g., cable modem, digital subscriber line, satellite, cellular data, etc.), and, further, due to varying levels of signal quality within any given type of connection and the amount of other unrelated traffic on the connection. Throughout this disclosure, the term "streaming capacity" will be understood to refer not just to the capacity of user equipment itself, but the user's network connection and any additional interconnections between the user equipment and the source of content that is being provided to the user equipment. In some cases, the streaming capacity may not be a precise bitrate, but, rather, may refer to a range of capacities that are reasonable for providing content from the source to the user equipment. If a user attempts to view a video stream that is encoded at a bitrate that is greater than their capacity to download, the user may encounter significant buffering delays. Conversely, if a user attempts to view a video stream that is encoded at a bitrate that is less than their downloading capacity, the quality of the resulting video may be less than the user's connection can support. In either case, the user's viewing experience is worse than it would be if the user were provided with a video stream having a bitrate that closely matched the download capacity.

Therefore, in order to better serve their viewers, creators and distributors of such streaming video content may offer a plurality of streams (e.g., two, five or seven streams) of a given program, with each stream encoded at a different bitrate to suit the needs of a different group of users. Users may be given the option to select a stream having a bitrate that suits their needs. As an alternative, a software application executed by the user's equipment may select an appropriate stream, or the provider or distributor may detect the quality of a user's connection and select an appropriate stream for that user.

Users' capacities to stream content at greater data rates increase over time due to the evolution of technology, such as new types of connections to stream to users' homes or the introduction of higher-quality mobile data connections. Users' ability to take advantage of increasing bandwidth to realize better streaming quality depends on whether providers offer streams that are encoded at higher bitrates (and, consequently, provide higher-quality video). However, encoding settings are revisited very infrequently, often only done with the introduction of a new product or the creation of a new business arrangement with a partner, and may typically remain static for years for any given product. Further, encoding settings are typically determined based on industry-standard service levels for available products (e.g., the speed of a typical cable modem or of a typical cellular data connection), and do not take into account the capacity of a provider's actual customer base, or the capacity of a specific program's viewership.

Figure 1:
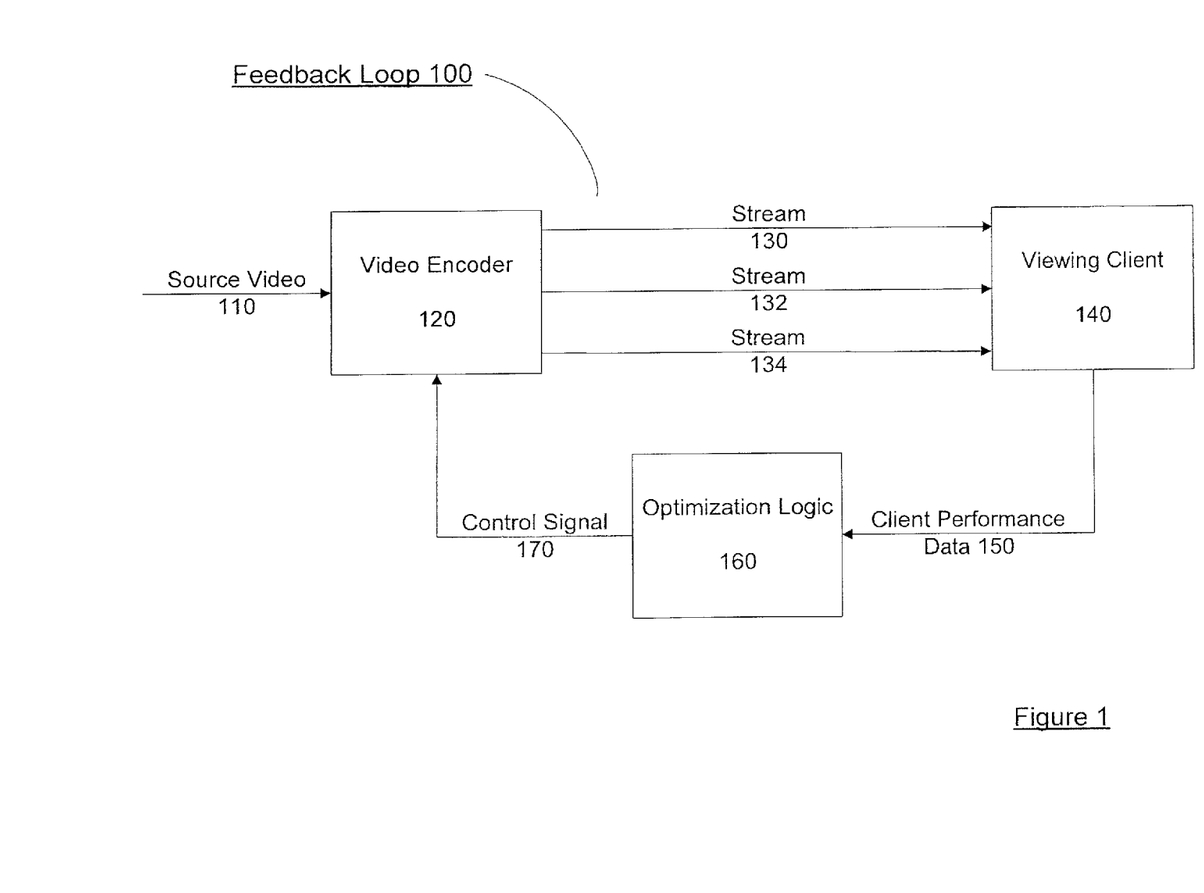
FIG. 1 schematically illustrates a feedback loop for optimizing bitrate selection according to an exemplary embodiment.

The exemplary embodiments may enable content creators and distributors to better serve their customers by adapting their encoding settings to their customers' streaming capacity. FIG. 1 conceptually illustrates an exemplary feedback loop 100 that may accomplish such adaptation. Source video 110 is received from a source by a video encoder 120. It will be apparent to those of skill in the art that the video encoder 120 may typically be a combination of encoding software and hardware executing the encoding software according to a set of configurable encoding parameters, and that the single video encoder 120 shown in FIG. 1 may represent multiple encoders, each encompassing its own hardware and software. It will be further apparent that the source video 110 may represent a single video program or may conceptually represent a plurality of video programs that are all subject to the processing that will be described hereinafter.

The feedback loop 100 will be described with reference to a single video program but it will be apparent to those of skill in the art that the same steps may be performed in a substantially equivalent manner on a plurality of video programs. Additionally, though the exemplary embodiments will be described herein with reference to streaming video, the broader principles embodied therein are equally applicable to any type of encoded signal (e.g., audio, multimedia, etc.). Typically, the feedback loop 100, with the exception of the viewing client 140, may be administered by a video provider of the source video 100. However, in other exemplary embodiments, one or more third parties may operate parts of the feedback loop 100. In one such embodiment, the source video 100 may originate from a content generator that is different from a broadcaster encoding and providing the video streams 130, 132 and 134 to the viewing client 140.

The video encoder 120 encodes the source video 110 into encoded video streams 130, 132 and 134 at different encoding bitrates according to the configuration of the video encoder 120. It will be apparent to those of skill in the art that the precise number of bitrates that are offered may vary among different embodiments and the display of three streams 130, 132 and 134 is only exemplary. It will be further apparent to those of skill in the art that the bitrates used may vary among differing embodiments and that the specific bitrates are only to illustrate the general concepts described herein. Once the video streams 130, 132 and 134 have been encoded, they are provided to a viewing client 140 through any of the various mechanisms known in the art, such as through a browser-based client or a dedicated software application. Similar to the source video 110, it will be apparent to those of skill in the art that the viewing client 140 may represent a plurality of actual viewers accessing one or more streams through a plurality of different connection channels, and that only one viewing client 140 is shown for clarity.

One of the streams 130, 132 or 134 is selected for viewing by the viewing client 140. The selection may be made by user input, or automatically by software at the viewing client 140 that selects an appropriate stream based on the connection quality available to the viewing client 140. Based on the viewing of one of the video streams 130, 132 or 134 by the viewing client 140, client performance data 150 is generated. In some embodiments, client performance data 150 may be generated only upon initial selection of one of the streams 130, 132 or 134 by the viewing client 140; in other embodiments, further client performance data 150 may be generated if the viewing client 140 switches from one of the streams 130, 132 or 134 to another, such as due to user request or automatically due to changing capacity of the viewing client 140. The client performance data may include any type of data that may describe the performance of the viewing client 140, such as streaming capacity, selection of one of the video streams 130, 132 or 134, connection type, etc. The client performance data 150 may be transmitted to optimization logic 160. As described above with reference to the streams 130, 132 and 134, this may be accomplished through any of the various mechanisms known in the art, such as through a browser-based client or a dedicated software application. The optimization logic 160 may take the form of a codec, but in alternative embodiments may be implemented as hardware, software, firmware, or a combination of the above (e.g., a field-programmable gate array, or "FPGA").

The optimization logic 160, like the video encoder 120, may typically be a combination of analysis software and hardware executing the analysis software. The optimization logic 160 may analyze the client performance data 150 received across a large number of viewing clients 140 in order to optimize the encoding of the source video 110 by the video encoder 120, and send a control signal 170 to the viewing encoder 120 to perform the optimized encoding. This analysis may involve dividing various groups of users (e.g., viewing clients 140) into groupings (occasionally referred to by those of skill in the art as "buckets") and selecting an encoding bitrate to target each grouping. Providing a viewer with a stream having a bitrate that is faster than the user's capacity may result in significant buffering and skipping in the user's video; conversely, a stream having a bitrate that is less than than the user's capacity may result in the user's viewing experience being worse than the user's streaming capacity could support. Thus, it may be desirable to have a large number of streams in order to provide each user (e.g., each viewing client 140) with a stream encoded at a bitrate that is as close as possible to the bitrate that can be supported. However, because encoding a stream may entail the dedication of computational resources, and, therefore, the total resources may be directly proportional to the quantity of streams to be encoded, the number of groupings used may be equal to the number of streams that can be encoded using the amount of resources that will be devoted to the encoding process.

Figure 2:
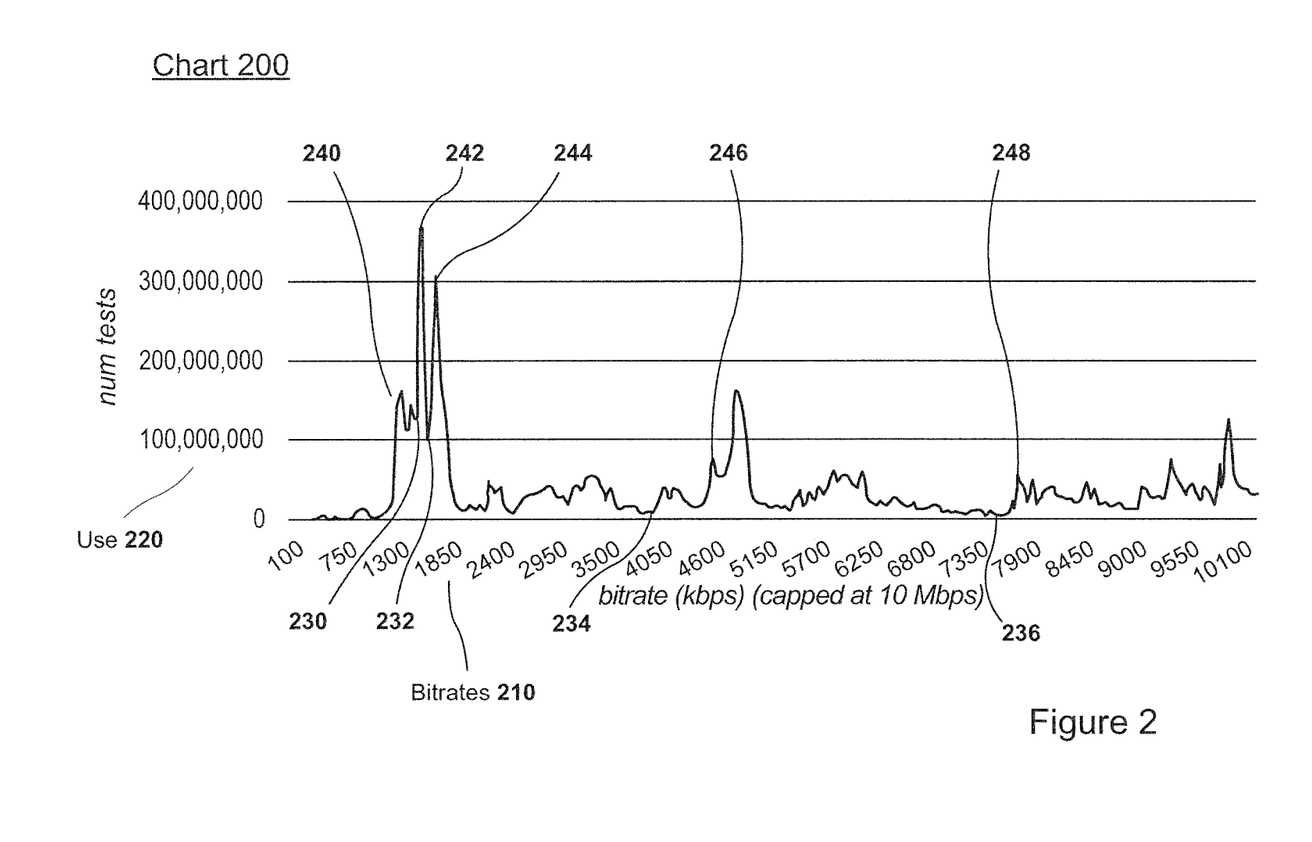
FIG. 2 illustrates an exemplary chart of bandwidth usage.

FIG. 2 illustrates an exemplary chart 200 showing raw data plotting a range of bitrates 210, in kilobytes per second ("kbps"), along the X axis, and a metric of use 220 along the Y axis, over a given time interval. It will be apparent to those of skill in the art that the time interval selected for analysis may be predetermined or user-configured, and may vary among different implementations of a system implementing the feedback loop 100. Consideration of too recent a time window prior to the time of analysis may result in an analysis that considers short-term fluctuations in user bandwidth capacity. Conversely, consideration of too long a time window prior to the time of the analysis may result in an analysis that is not responsive to changes in transmission technology. The time range may be anywhere from a few hours in length (e.g., the time between two consecutive event starts) to a month, and may typically be in the range of one day to one week.

In the exemplary chart 200, the metric shown is a number of bandwidth tests (e.g., pings) over the time interval. However, it will be apparent to those of skill in the art that different metrics may be used without departing from the broader principles from the exemplary embodiments. For example, alternative metrics may include a number of users or a number of hours of viewed content. The optimization logic 160 may consider data such as shown in the exemplary chart 200; divide the metrics, which are representative of the proportion of users having a given bitrate capacity, into groupings as described above, and select an encoding bitrate for each grouping.

Considering the specific data shown in the chart 200, the optimization logic may identify a first grouping containing users at bitrates up to point 230, a second grouping containing users at bitrates between points 230 and 232, a third grouping containing users at bitrates between points 232 and 234, a fourth grouping containing users at bitrates between points 234 and 236, and a fifth grouping containing users at bitrates greater than point 236. The optimization logic 160 may then determine an optimal set of encoding bitrates such that one of the determined bitrates is optimal for each of the groupings.

In one exemplary embodiment, the bitrate selected for each of the groupings is the bitrate of the user with the slowest streaming capacity in each of the groupings; in another exemplary embodiment, the bitrate selected for each grouping is the average of the streaming capacity of all the users in the grouping. There may be a variety of other statistical or empirical ways for selecting a most appropriate bitrate for the plurality of users contained within a grouping. In one embodiment, the bitrate selected for a grouping may be a bitrate that is lower than the lowest capacity of any of the users within the grouping to ensure that all of the users in the group are capable of operating at the selected bitrate. Returning to the example of FIG. 2, a bitrate corresponding to point 240 may be chosen for the first grouping, a bitrate corresponding to point 242 may be chosen for the second grouping, a bitrate corresponding to point 244 may be chosen for the third grouping, a bitrate corresponding to point 246 may be chosen for the fourth grouping, and a bitrate corresponding to point 248 may be chosen for the fifth grouping. These selections are only exemplary and other divisions of users into groupings and selection of bitrates for groupings may be made for the same or different data.

Figure 3A:
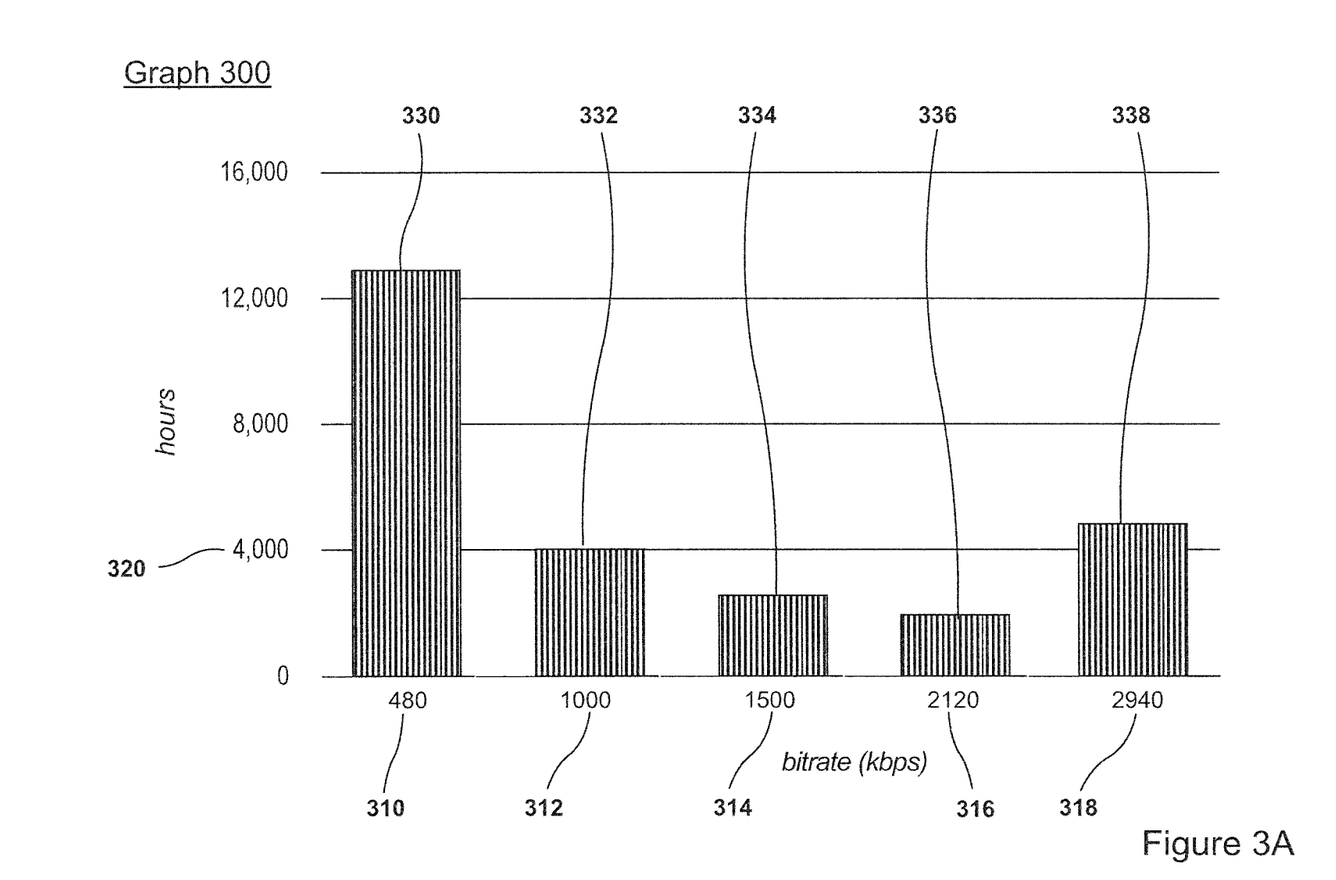
FIG. 3A illustrates a first set of exemplary client performance data.
Figure 3B:
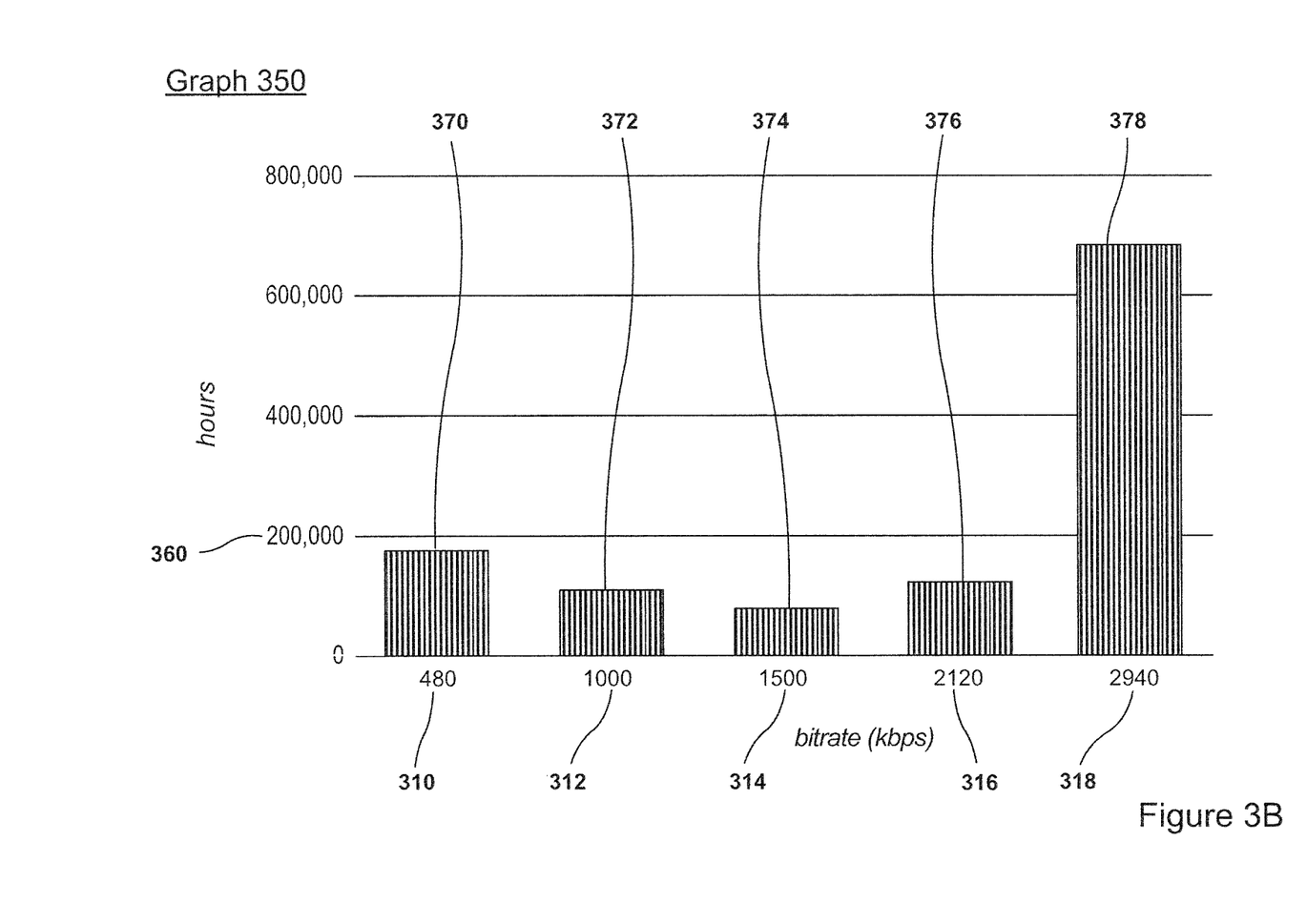
FIG. 3B illustrates a second set of exemplary client performance data.

In one exemplary embodiment, the client performance data 150 may take the form of a number of users selecting each of a plurality of streams of the same program encoded at different bitrates, or, alternatively, a number of hours of video viewed over each of a plurality of streams. FIGS. 3A and 3B illustrate different result sets of client performance data 150. FIG. 3A shows a bar graph 300 of data for five different streams: a first stream 310 encoded at a bitrate of 480 kbps, a second stream 312 encoded at a bitrate of 1000 kbps, a third stream 314 encoded at a bitrate of 1500 kbps, a fourth stream 316 encoded at a bitrate of 2120 kbps, and a fifth stream 318 encoded at a bitrate of 2940 kbps. The number of hours viewed for each of the streams 310, 312, 314, 316 and 318 over a selected time interval is shown along the Y axis 320.

FIG. 3A shows result data 330 for stream 310 indicating roughly 13,000 hours viewed during the time interval. Result data 332 for stream 312 shows roughly 4,000 hours viewed during the time interval. Result data 334 for stream 314 indicates roughly 2,500 hours viewed during the time interval. Result data 336 for stream 316 shows roughly 2,000 hours viewed during the time interval, and result data 338 for stream 318 indicates roughly 4,500 hours viewed during the time interval. Because of the large number of viewer devices selecting stream 310, the optimization logic 160 may opt to provide an additional low-end bitrate to provide a viewing experience more tailored to the needs/ preferences of these viewers. For example, the optimization logic 160 may eliminate stream 318 (which might result in the viewers who selected stream 318 selecting stream 316 instead) and create a new stream at a lower bitrate than that of stream 310. Further client performance data 150 may be generated based on this new set of streams, and the optimization logic 160 may analyze this further client performance data 150 and further adjust the bitrates, in keeping with the typical manner of operation of a feedback loop.

FIG. 3B shows an alternate bar graph 350 showing different results for the same five streams 310, 312, 314, 316 and 318 shown in FIG. 3A along a differently-scaled Y axis 360. Result data 370 for stream 310 indicates roughly 180,000 hours viewed during the time interval. Result data 372 for stream 312 shows roughly 120,000 hours viewed during the time interval. Result data 374 for stream 314 indicates roughly 80,000 hours viewed during the time interval. Result data 376 for stream 316 shows roughly 120,000 hours viewed during the time interval. Result data 378 for stream 318 indicates roughly 700,000 hours viewed during the time interval. Because of the large number of viewers selecting stream 318, including more viewers than selected the other four streams combined, the optimization logic may opt to provide an additional high-end bitrate to provide a viewing experience more tailored to the needs/ preferences of these viewers. For example, the optimization logic 160 may eliminate stream 316 (which might result in the viewers who selected stream 316 selecting stream 314 instead) and create a new stream at a faster bitrate than that of stream 318. Further client performance data 150 may be generated based on this new set of streams, and the optimization logic 160 may analyze this further client performance data 150 and further adjust the bitrates, in keeping with the typical manner of operation of a feedback loop. The specific possible actions by the optimization logic 160 described above are only exemplary, it will be apparent to those of skill in the art that there may be a variety of optimization algorithms known in the art that might be applied to the client performance data 150 by the optimization logic 160 at this point.

As described above, because each additional stream offered to users has a cost in terms of the requirement to devote computing resources to encode the stream, the provider of the streams may limit the number of bitrates (and, correspondingly, streams) that are available. For example, a provider may determine that it wishes to allocate computing resources sufficient to encode three streams. However, the limited quantity of streams offered to users to choose from may result in less useful data about the various users' streaming capacity. Therefore, in one exemplary embodiment, users may be offered streams at bitrates that have not actually been encoded in order to count users that select those streams in addition to the streams that have been encoded. It will be apparent to those of skill in the art that, in the context of selection, streams may be offered to users in a variety of manners, including providing users with the opportunity to select from all available streams, providing users with the opportunity to select only from a subset of streams that are suitable for the individual users' capacities, providing data to be used by user equipment in making an automatic selection of an appropriate stream, or any other manner of providing streaming data at different bitrates that is known in the art.

For example, referring to the feedback loop 100 of FIG. 1 and the data sets shown in FIGS. 3A and 3B, the video encoder 120 may initially be configured to encode streams 130, 132 and 134 at 480 kbps (e.g., stream 310), 1500 kbps (e.g., stream 314), and 2940 kbps (e.g., stream 318). However, to enhance the precision (and, thus, the usefulness) of the client performance data 150, fictitious bitrates may be created. For example, stream 312 at 1000 kbps, interspersed between stream 310 at 480 kbps and stream 314 at 1500 kbps, may be created based on stream 310 and offered to users for selection. Such a stream may be created by padding a lower bitrate stream with null data to create a higher bitrate stream for transmission to a viewing client 140. The padding may be performed server-side (e.g., as an additional function performed by video encoder 120) or by a content delivery network ("CDN") in order not to have the null data be transmitted by the broadcaster. Thus, by offering more bitrates than are actually encoded, the feedback loop 100 may generate more useful client performance data 150.

Figure 4:
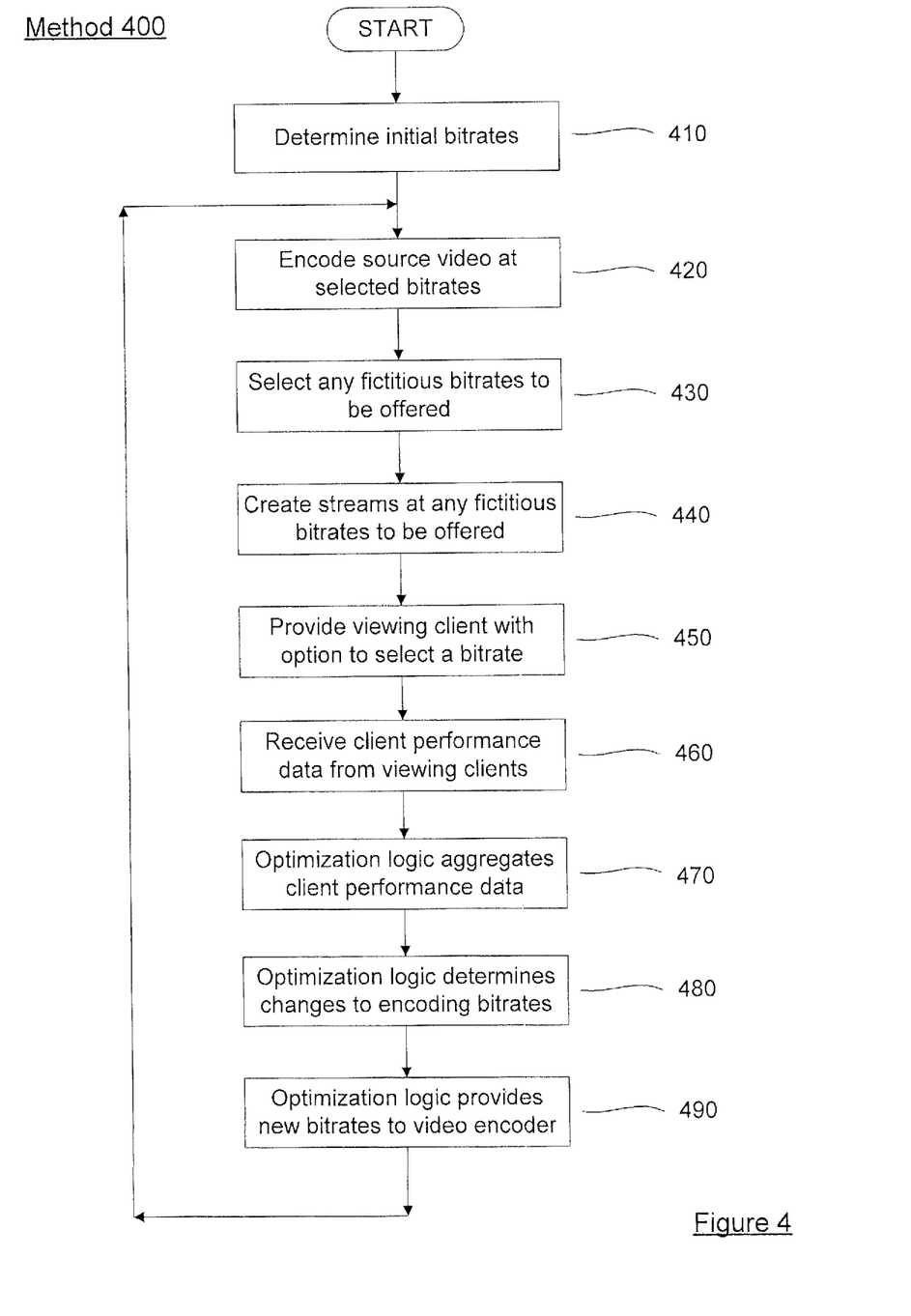
FIG. 4 illustrates a method for optimizing bitrate selection using the feedback loop of FIG. 1 according to an exemplary embodiment.

FIG. 4 illustrates an exemplary method 400 for implementing the feedback loop 100 of FIG. 1. The method 400 will be described herein with reference to the elements of the exemplary feedback loop 100. In step 410, initial bitrates at which the source video 110 is to be encoded by the video encoder 120 are selected. The initial bitrates may be determined, for example, using prior art methods such as based on industry-level averages for users' downstream speed capacity, based on competitors' streaming offerings, etc. In step 420, the source video 110 is encoded by the video encoder 120 at the bitrates selected in step 410.

In step 430, any fictitious bitrates that may be offered to user devices for selection are selected. Fictitious bitrates may be selected either algorithmically or through manual input from a system operator. In one algorithmic embodiment, one or more fictitious bitrates can be selected at a point or points between real bitrates. This selection can be at one predetermined point in the range (e.g., at the midpoint of the range; for real bitrates 100 kb/s and 200 kb/s, this would select a fictitious bitrates of 150 kb/s), at two predetermined points (e.g., at 30% of the way through the range and 50% of the way through the range; for real bitrates 100 kb/s and 200 kb/s, this would select fictitious bitrates of 130 kb/s and 150 kb/s), or at a randomized point in the range (e.g., for real bitrates 100 kb/s and 200 kb/s, a fictitious bitrate could be randomly chosen anywhere within the range, with random selection being performed through any randomization means known in the art).

In another algorithmic embodiment, a fictitious bitrate may be selected at a predetermined or randomized percentage higher than each real bitrate, provided that this increase does not exceed the next higher bitrate. This technique may be particularly suitable for consideration of rates higher than the highest real bitrate. For example, a predetermined percentage of 5% may be used (e.g., for a real bitrate of 100 kb/s, a fictitious bitrate of 105 kb/s may be created). Multiple bitrates may also be selected in this manner (e.g., fictitious bitrates created at 5% and 10% increases over each real bitrate).

In another algorithmic embodiment, a fictitious bitrate may be selected at a predetermined or randomized amount higher than each real bitrate, provided that this increase does not exceed the next higher bitrate. This technique may also be particularly suitable for consideration of rates higher than the highest real bitrate. For example, a predetermined increase of 20 kb/s may be used (e.g., for a real bitrate of 100 kb/s, a fictitious bitrate of 120 kb/s may be created). Multiple bitrates may also be selected in this manner (e.g., fictitious bitrates created at 10 kb/s and 20 kb/s increases over each real bitrate).

In step 440, streams at desired fictitious bitrates that were identified in step 430 are created based on streams that were encoded in step 420. As described above, fictitious bitrates may be employed in order to obtain user selection data about a wider variety of bitrate options than a broadcaster may wish to provide, due to the resource cost of providing multiple bitrates. Also as described above, streams at fictitious bitrates may be created by padding a lower-bitrate stream with null (e.g., dummy) data. The selection and creation of fictitious bitrate streams are not required because the method 400 may still provide useful data relating to user preferences without employing fictitious bitrates. Additionally, null data is only one example of a type of data that may be used as padding to generate a stream at a fictitious bitrate. In another embodiment, rather than null data, other non-video data or separate video data may be used as padding. In a further embodiment, random noise data could be used in order to prevent the effects of transparent compression systems within the data stream.

In step 450, the viewing client 140 may be provided with an option to select from the various available bitrates. This may include streams at both real bitrates, as encoded in step 420, and streams at fictitious bitrates, as generated in step 440. The selection by the viewing client 140 may be manual (e.g., a user of the viewing client 140 may input a selection) or automatic (e.g., a software application executed at the viewing client 140 may determine an appropriate stream for the viewing client 140 based on its streaming capacity). It will be apparent to those of skill in the art that the streams are, in actuality, provided to a plurality of viewing clients in order to yield useful client performance data 150, and that a single viewing client 140 is discussed herein for purposes of clarity. Once the viewing client 140 makes a selection, the selected stream may be provided to the viewing client 140 from the provider through known means, such as via a CDN, but the actual provision of the selected stream is beyond the scope of the exemplary embodiments and will not be discussed further herein. As previously noted, the selection by the viewing client 140 may be made manually by a user of the viewing client 140, or automatically by software of the viewing client 140 based on the streaming capacity of the viewing client 140. Additionally, automatic switching between streams at different bitrates may be done "on the fly" during the course of a program, not just at the beginning of a particular program.

The selection of one of the streams 130, 132 and 134 by the viewing client 140 is only one way to determine the streaming capacity of the viewing client 140. In another exemplary embodiment, a software application executed by the viewing client 140 may determine the streaming capacity of the viewing client 140 and report the capacity to the optimization logic 160 as the client performance data 150. There may be a variety of ways in which such a software application may make this determination, such as by downloading a file of known size and determining streaming capacity by dividing the size by the download time.

In step 460, client performance data 150 is sent from the viewing client 140 to the optimization logic 160. As noted above, this may be accomplished by means of a browser-based client, a dedicated software application, or any other appropriate mechanism that is known in the art. Alternatively, in some embodiments, no affirmative "sending" step may be required, but, rather, the client performance data 150 may be generated provider-side based on the sending of the different streams to various users. It will be apparent to those of skill in the art that, from the perspective of the optimization logic 160, client performance data 150 may originate from a plurality of viewing clients that are represented schematically by the viewing client 140. In step 470, the optimization logic 160 aggregates client performance data 150 received from a plurality of viewing clients to yield statistical data such as that shown in FIGS. 2, 3A and 3B.

In step 480, the optimization logic 160 determines changes to be made to the encoding bitrates, if any, based on the client performance data 150. As described above, this may involve eliminating a bitrate selected by few users, creating a new bitrate to replace an eliminated bitrate, or use of other optimization methodology known in the art. In step 490, the optimization logic 160 sends a control signal 170 to the video encoder 120 containing instructions for changes to the bitrates used in the encoding. Following step 490, the method 400 returns to step 420, and the video encoder 120 uses the newly-determined bitrates for subsequent encoding. It will be apparent to those of skill in the art that the method 400 may typically be an ongoing optimization process without a predefined endpoint, and therefore does not include a termination point, but that performance of the optimization process may be terminated by the content provider at any desired point in time. It will be further apparent to those of skill in the art that an operator of the feedback loop may have the option to limit the frequency of updating the bitrates, or of the performance of the method 400 as a whole, in order to minimize computing demands.

The exemplary embodiments may provide for a dynamic and updated selection of bitrates for the encoding of streaming video. As opposed to prior art methods that may simply base encoding bitrates on industry standard technology levels, the exemplary embodiments may provide an initial set of bitrates based on industry standards or a similar basis, and may then continually optimize the encoding bitrates based on the streaming capacities of a provider's viewers. Although the exemplary embodiments have been described above with reference to the determination of "optimal" bitrates, it will be apparent to those of skill in the art that a completely optimal result may be an unattainable goal, and that, even if the exemplary embodiments merely provide an improved set of bitrates that may not be optimal in an absolute sense, this may still be a valuable result. The exemplary embodiments may provide for bitrates that evolve along with developments in streaming technology on a more regular basis than prior techniques. The exemplary embodiments may further enable the provider's streaming offerings to best cater to the provider's specific viewer base, or even to the viewers of a specific program. As a result, more viewers of the provider's programming may enjoy an optimized viewing experience.

Those of skill in the art will understand that the above-described exemplary embodiments may be implemented in any number of matters, including as a software module, as a combination of hardware and software, etc. For example, the exemplary method 400 may be embodied in a program stored in a non-transitory storage medium and containing lines of code that, when compiled, may be executed by a processor.

It will be apparent to those skilled in the art that various modifications may be made to the exemplary embodiments, without departing from the spirit or the scope of the invention. Thus, it is intended that the present invention cover modifications and variations of this invention provided they come within the scope of the appended claims and their equivalents.

What is claimed is:

1. A method, comprising:
   encoding a video program into a first plurality of video streams, each of the first plurality of video streams being encoded at a corresponding one of a first plurality of bitrates;
   generating a first alternate video stream at a first alternate bitrate that is not one of the first plurality of bitrates at which the first plurality of video streams are encoded, wherein the first alternate video stream at the first alternate bitrate is generated based on one of the first plurality of video streams padded with additional data after the one of the first plurality of video streams has been encoded;
   providing, to a plurality of viewing clients, an option to select one of the first plurality of video streams or the first alternate video stream at the first alternate bitrate;
   receiving, by an optimization logic, a streaming capacity of each of the plurality of viewing clients, wherein the streaming capacity of each of the plurality of viewing clients is based on a selection of one of the first plurality of video streams or the first alternate video stream at the first alternate bitrate; and
   determining, by the optimization logic, a second plurality of bitrates based on at least one selection of the first alternate stream at the first alternate bitrate by the plurality of viewing clients.

2. The method of claim 1, further comprising:
   encoding the video program into a second plurality of video streams, each of the second plurality of video streams being encoded at a corresponding one of the second plurality of bitrates; and
   generating a second alternate video stream at a second alternate bitrate that is not one of the second plurality of bitrates at which the second plurality of bitrates are encoded.

3. The method of claim 2, further comprising:
   providing, to a plurality of further viewing clients, an option to select one of the second plurality of video streams or the second alternate video stream at the second alternate bitrate;
   receiving a streaming capacity of each of the further viewing clients, wherein the streaming capacity of each of the further viewing clients is based on a selection of one of the second plurality of video streams or the second alternate video stream at the second alternate bitrate; and
   determining a third plurality of bitrates based on the streaming capacities of the plurality of further viewing clients.

4. The method of claim 1, wherein the additional data is one of null data, random noise, video data or non-video data and wherein the first alternate video stream at the first alternate bitrate is higher than the bitrate of the one of the first plurality of video streams that is selected to generate the first alternate video stream at the first alternate bitrate.

5. The method of claim 1, wherein determining the improved second plurality of bitrates comprises:
   dividing the plurality of viewing clients into a plurality of groupings;
   selecting an optimal bitrate for each of the groupings; and
   using the optimal bitrates for each of the groupings as the plurality of bitrates.

6. The method of claim 5, wherein each of the plurality of groupings includes a substantially equal portion of the viewing clients.

7. The method of claim 5, wherein the optimal bitrate for each of the groupings is one of a slowest streaming capacity of the plurality of viewing clients in the grouping and an average of the streaming capacities of the plurality of viewing clients in the grouping.

8. The method of claim 1, wherein receiving, by an optimization logic, the streaming capacity of each of the plurality of viewing clients comprises receiving an indication of the streaming capacity from client-side equipment of each of the plurality of viewing clients.

9. The method of claim 1, wherein receiving, by the optimization logic, the streaming capacity of each of the plurality of viewing clients comprises receiving the selection of one of the first plurality of video streams or the first alternate video stream at the first alternate bitrate from each of the plurality of viewing clients
wherein receiving the selection of one of the first plurality of video streams or the first alternate video stream at the first alternate bitrate from each of the plurality of viewing clients comprises receiving one of a user selection and a software-based selection from each of the plurality of viewing clients.

10. A system, comprising:
a video encoder, configured to encode a source video into a first plurality of video streams, each of the first plurality of video streams being encoded at a corresponding one of a plurality of bitrates and generating a first alternate video stream at an alternate first alternate bitrate that is not one of the plurality of bitrates at which the first plurality of video streams are encoded, wherein the first alternate video stream at the first alternate bitrate is generated based on one of the first plurality of video streams padded with additional data after the one of the first plurality of video streams has been encoded; and
an optimization logic, configured to receive a streaming capacity of each of a plurality of viewing clients, wherein the streaming capacity of each of the plurality of viewing clients is based on a selection of one of the first plurality of video streams or the first alternate video stream at the first alternate bitrate and wherein the optimization logic is further configured to determine a second plurality of bitrates based on at least one selection of the first alternate video stream at the first alternate bitrate by the plurality of the viewing clients,
wherein the video encoder and the optimization logic are configured to be processed by one or more processors, and wherein the one or more processors are coupled to a memory.

11. The system of claim 10, wherein the optimization logic is further configured to instruct the video encoder to encode the video program into a second plurality of video streams, each of the second plurality of video streams being encoded at a corresponding one of the second plurality of bitrates and wherein the optimization logic is further configured to instruct the video encoder to generate a second alternate video stream at a second alternate bitrate.

12. The system of claim 11, wherein the optimization logic is further configured to receive a streaming capacity of each of a further plurality of viewing clients of the second plurality of video streams, wherein the streaming capacity of each of the further plurality of viewing clients is based on a selection of one of the second plurality of video streams or the second alternate video stream at the second alternate bitrate and wherein the optimization logic is further configured to determine a third plurality of bitrates based on the streaming capacities of the plurality of further viewing clients.

13. The system of claim 10, wherein the additional data is one of null data, random noise, video data or non-video data and wherein the further stream at the alternate bitrate is higher than the bitrate of the one of the first plurality of video streams that is selected to generate the first alternate video stream at the first alternate bitrate.

14. The system of claim 10, wherein the optimization logic determines the second plurality of bitrates by:
dividing the plurality of viewing clients into a plurality of groupings;
selecting an optimal bitrate for each of the groupings; and
using the optimal bitrates for each of the groupings as the plurality of bitrates.

15. The system of claim 14, wherein each of the plurality of groupings includes a substantially equal portion of the viewing clients.

16. The system of claim 14, wherein the optimal bitrate for each of the groupings is one of a slowest streaming capacity of the plurality of viewing clients in the grouping and an average of the streaming capacities of the plurality of viewing clients in the grouping.

17. The system of claim 10, wherein receiving the streaming capacity of each of the plurality of viewing clients comprises receiving an indication of the streaming capacity from client-side equipment of each of the plurality of viewing clients.

18. The system of claim 10, wherein receiving the streaming capacity of each of the plurality of viewing clients comprises receiving a selection of one of the first plurality of video streams or the first alternate video stream at the first alternate bitrate from each of the plurality of viewing clients,
wherein receiving the selection of one of the first plurality of video streams or the first alternate stream at the first alternate bitrate from each of the plurality of viewing clients comprises receiving one of a user selection and a software-based selection from each of the plurality of viewing clients.

19. The system of claim 10, wherein the optimization logic comprises one of hardware, software, firmware, a codec, and a field-programmable gate array.

20. A non-transitory computer-readable storage medium storing a set of instructions that are executable by a processor, the set of instructions, when executed by the processor, causing the processor to perform operations comprising:
encoding a video program into a first plurality of video streams, each of the first plurality of video streams being encoded at a corresponding one of a plurality of bitrates;
generating a first alternate video stream at a first alternate bitrate that is not one of the plurality of bitrates at which the first plurality of video streams are encoded, wherein the first alternate video stream at the first alternate bitrate is generated based on one of the first plurality of video streams padded with additional data after the one of the first plurality of video streams has been encoded;
providing, to a plurality of viewing clients, an option to select one of the first plurality of video streams or the first alternate video stream at the first alternate bitrate;
receiving, by an optimization logic, a streaming capacity of each of the plurality of viewing clients, wherein the streaming capacity of each of the plurality of the viewing clients is based on a selection of one of the first plurality of video streams or the first alternate video stream at the first alternate bitrate; and determining, by the optimization logic, a second plurality of bitrates based on at least one selection of the first alternate video stream at the first alternate bitrate by the plurality of viewing clients.

21. The non-transitory computer-readable storage medium of claim 20, wherein the operations further comprise:

encoding the video program into a second plurality of video streams, each of the second plurality of video stream being encoded at a corresponding one of the second plurality of bitrates.

* * * * *

UNITED STATES PATENT AND TRADEMARK OFFICE
CERTIFICATE OF CORRECTION

PATENT NO. : 10,893,266 B2  
APPLICATION NO. : 14/508214  
DATED : January 12, 2021  
INVENTOR(S) : Reisner et al.

Page 1 of 1

It is certified that error appears in the above-identified patent and that said Letters Patent is hereby corrected as shown below:

In the Claims

Claim 5, Column 10, Lines 59:
"improved second plurality of bitrates comprises:" should read "second plurality of bitrates comprises:"

Claim 10, Column 11, Lines 29:
"first alternate video stream at an alternate first alternate" should read "first alternate video stream at first alternate"

Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*